Nov. 29, 1960     F. H. NADIG ET AL     2,961,918
HIGH SPEED CAMERA

Filed Oct. 22, 1958     4 Sheets-Sheet 1

INVENTORS
FRANCIS H. NADIG
JACOB LLOYD BOHN
THEODORE KORNEFF
BY
ATTORNEYS

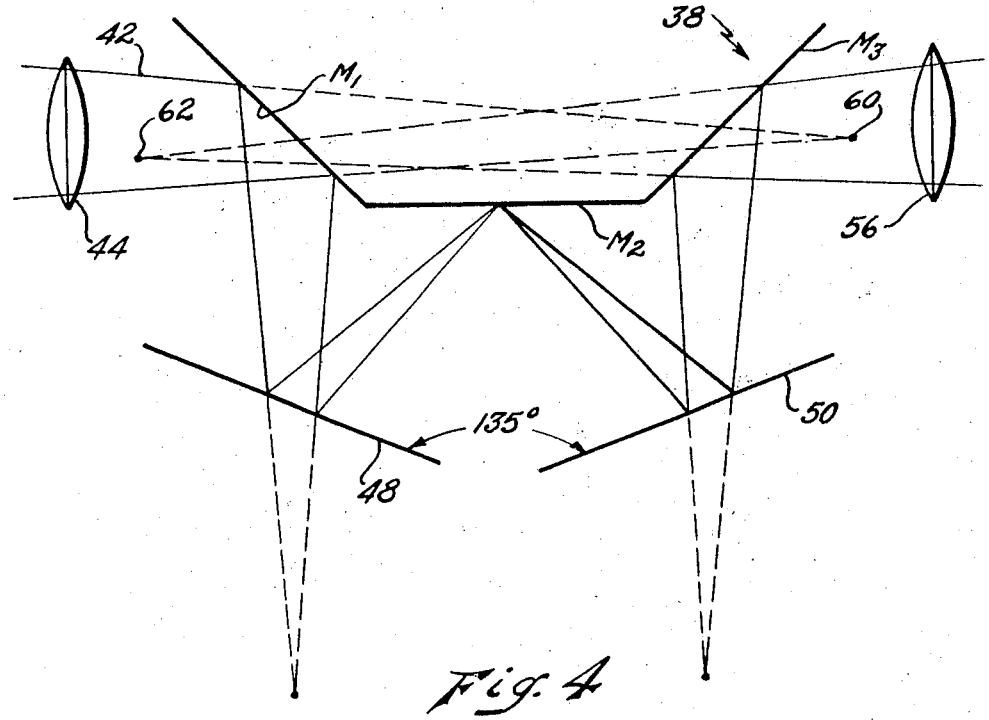
Fig. 4
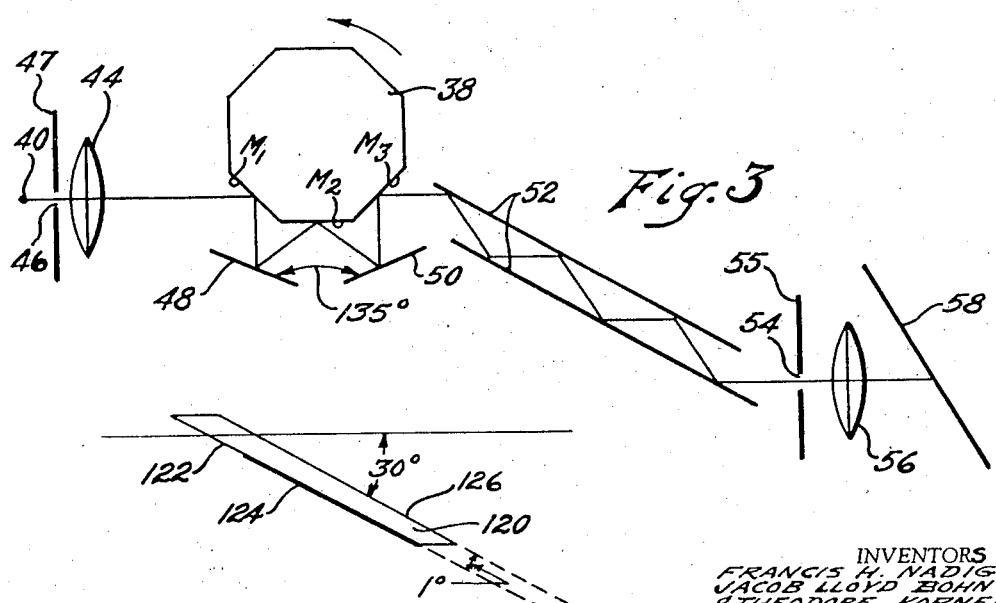
Fig. 3
Fig. 10
INVENTORS
FRANCIS H. NADIG
JACOB LLOYD BOHN
& THEODORE KORNEFF
BY
ATTORNEYS

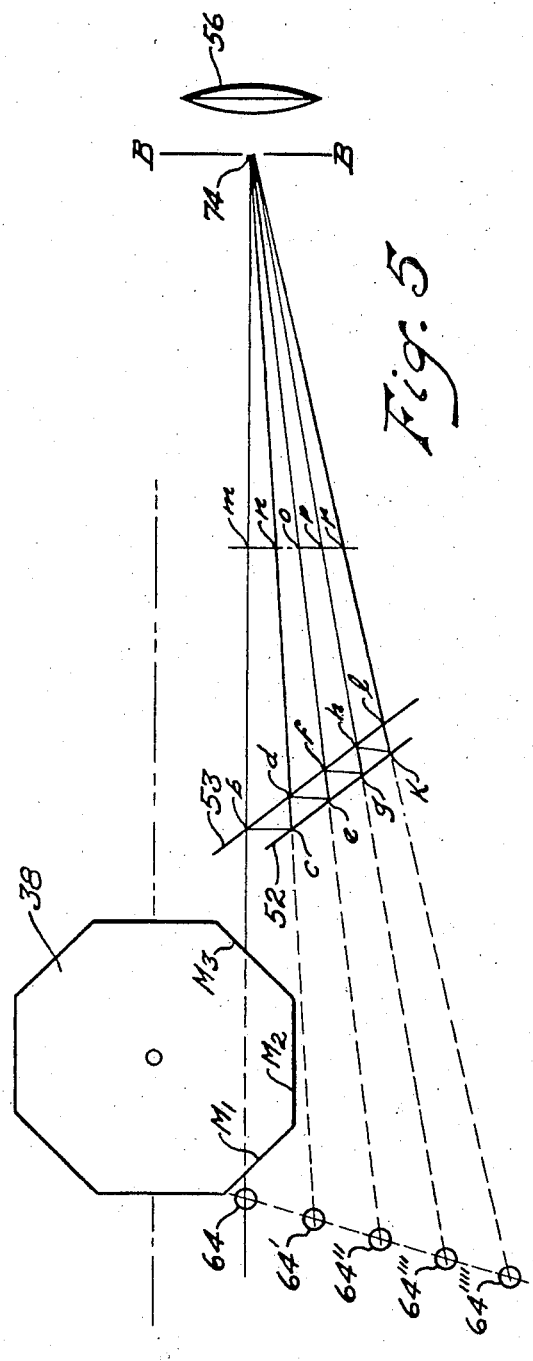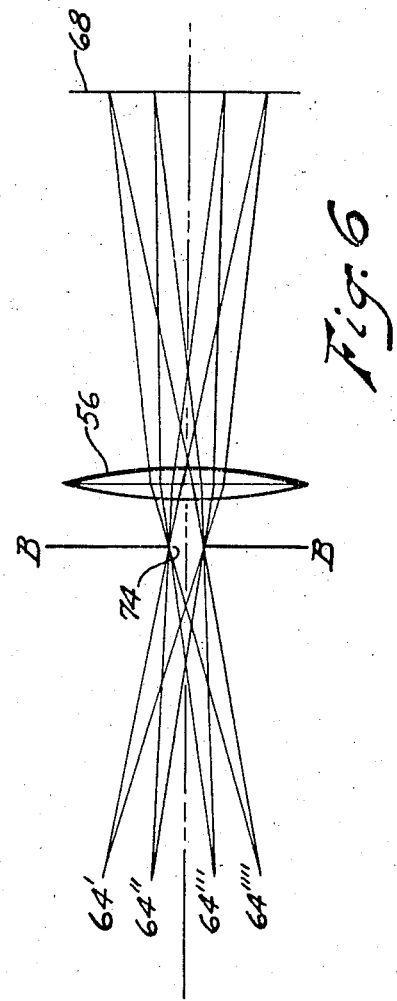

United States Patent Office 2,961,918
Patented Nov. 29, 1960

2,961,918
HIGH SPEED CAMERA

Francis H. Nadig, Philadelphia, and Jacob Lloyd Bohn, Glenside, Pa., and Theodore Korneff, Burlington, N.J., assignors to the United States of America as represented by the Secretary of the Air Force Filed Oct. 22, 1958, Ser. No. 769,048

8 Claims. (Cl. 88—16)

The present invention relates generally to high speed photography and, as illustrated herein, relates more particularly to a system for producing a series of photographic images by the use of a rotating reflector and a parallel plate image multiplier.

Photographing exploding wire or other exploding materials presents several difficult problems which must be solved before photographs containing sufficient detail can be produced. Three major conditions must be fulfilled. The image of the explosion must be substantially stationary on the photographic film to avoid obtaining a space smear photograph. A group of successive photographs of one explosion is desirable. The photographs of each group must have exposure times in the order of one microsecond or less with a substantial comparative time lapse between them.

In order to obtain photographs at various stages of the explosion, various expedients were tested with varying degrees of success. However, the exposure time was still too long and as a result the photograph lacked sufficient detail to give adequate information.

Attempts to obtain a series of photographs of each explosion containing sufficient detail to provide adequate information were successful only after a parallel plate image multiplier was used. This multiplier consisted of two parallel plane mirrors spaced a small distance apart so that a light reflected from a rotating mirror would be reflected from the parallel mirrors and finally enter an aperture and a camera lens after four or more reflections depending upon the angular position of the rotating mirror. This system produced the best results when a multifaced or octagonal mirror was substituted for the flat plate mirror.

One object of the present invention, accordingly, is to provide a reflecting system including a rapidly rotating reflector for projecting a series of images on a photographic film in spaced relation to each other so that the nature of the explosion as a function of time can be studied. To this end, the system also is provided with a pair of reflectors whose reflecting faces are approximately parallel to each other and are so spaced that the beam of light entering between the mirrors will have to undergo four or more reflections before it enters the aperture in front of the camera lens. Preferably, and as illustrated, the rotating mirror is octagonal to produce a much greater angular velocity of the reflected beam and thus reduces the exposure time to a point where photographic images having great detail are formed on a photographic film.

With the above and other objects and features in view, the invention will now be described with particular reference to the accompanying drawings, in which:

Fig. 3 illustrates schematically a preferred form of system;

Fig. 4 illustrates the image formation of the system shown in Fig. 3;

Fig. 5 illustrates schematically a preferred method for producing multiple images;

Fig. 6 illustrates multiple image formation on a photographic plate;

Fig. 10 illustrates a modified form of reflector adapted for use with the present invention.

The present invention relates to a simple lens and mirror system which is particularly adapted for use in making a series of photographs of an exploding wire or any other adequately illuminated, rapid changing phenomenon.

Figure 1:
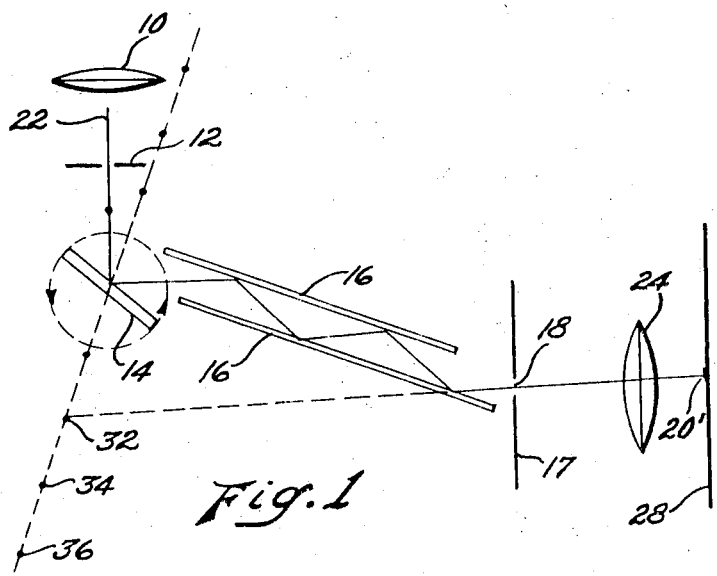
Fig. 1 is a schematic illustration of one modification of a reflector system for use in high speed photography.
Figure 2:
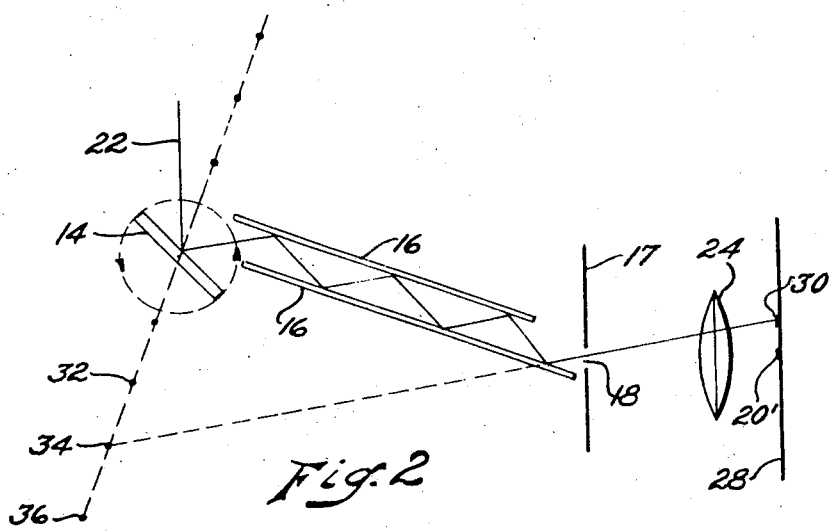
Fig. 2 is a view similar to Fig. 1 but showing the rotatable mirror in a different position.

The embodiment shown in Figs. 1 and 2 illustrates clearly the manner in which the invention is designed to operate. The system as shown in these figures comprises a lens 10, a slit 12, a rotating mirror 14, a pair of substantially parallel reflectors 16 and a second slit plate 17 having an aperture 18 arranged to control the admission of light to the lens system 24 of a suitable camera.

The mirror 14 may be formed of an aluminized plate of glass mounted vertically on a rotating spindle. When a rotating mirror is used in conjunction with an image multiplier such as is formed by reflecting plate mirrors 16, satisfactory exposures may be made to provide a series of images of a single explosion. This is accomplished even when exposures of the order of one microsecond spaced apart several microseconds are made.

This provision of the spaced reflecting plates 16 having substantially parallel reflecting surfaces produces the multiple images necessary for the formation of a series of exposures and allows for some adjustment in the time lapse between each exposure of the series. With the various reflecting elements in the position shown in Fig. 1 and with the explosion or an image thereof located at 20, a beam of light 22 therefrom will pass through the slit 12 and focus on the reflecting surface of the rotating mirror 14 and will be reflected therefrom to the substantially parallel mirrors 16. With the rotating mirror 14 in the position shown in Fig. 1, the beam 22 will be reflected four times before it enters the aperture 18 and the camera lens 24 thus forming an image 20 on a photographic film 28 after four reflections. When the rotating mirror 14 is in the position shown in Fig. 2, the beam 22 will have to undergo six reflections before it enters the aperture 18. It will be noted that the beam 22 enters the aperture 18 at a different angle, thus another image 30 will be formed on the photographic film 28 but at a different position.

Figs. 1 and 2 illustrate graphically the image formation of this system. As illustrated, the parallel mirrors 16 are spaced apart approximately ⅜ inch. A source of light located at 20, as described above, will produce multiple images in mirrors 16 apparently located at positions 32, 34, 36, etc. The images are apparently located at positions 32 and 34 when the mirror 14 is at the angular positions shown in Figs. 1 and 2. It is apparent that images will be formed at other locations as the angle of the reflecting surface of the rotating mirror 14 changes. These successive images are formed at regularly spaced positions on the photographic film. While Figs. 1 and 2 illustrate only two positions of the mirror 14, it is preferred to so arrange the system that a series of four to six exposures of each explosion may be made.

The time of exposure can be varied by the use of adjustable apertures. The first aperture 12 is effective to reduce the width of the beam 22 while the second aperture 18 reduces the time of the passage of the beam across the exposed portion of the camera lens 24. The method described above produces a series of images but, under some conditions, the time of exposure is still too great as is the time interval between exposures. In order to decrease these times, i.e., obtain a greater value of angular rotation of the beam, a multifaced rotating mirror is employed. When a beam is reflected from a rotating mirror, the angular velocity of the reflected beam is two times the angular velocity of the rotating mirror. For multiple reflection from a multifaced mirror, the angular velocity of the reflected beams equals $2n$ times the angular velocity of the mirror, where $n$ equals the number of reflections.

The modification shown in Fig. 3 utilizes an octagonal aluminized plastic mirror 38 which is arranged to be rotated as described previously. The mirror 38 is provided with a plurality of reflecting surfaces $M_1$, $M_2$, etc., which are arranged successively to be brought into reflecting position. It is to be noted that the object 40 is so located that a light beam 42 passes through a lens 44 which focuses on a reflecting face $M_1$ of the rotating mirror 38 after passing through an aperture 46 in slit plate 47. The image beam 42 is reflected from the surface $M_1$ to an inclined mirror 48, thence to a surface $M_2$ and then to a second inclined mirror 50. The beam 42 is then again reflected onto a surface $M_3$ of the octagonal mirror 38 and from that surface to a pair of plane mirrors 52 having substantially parallel reflecting surfaces and through an aperture 54 in slit 55 and a camera lens system 56 in a manner similar to the modification shown in Fig. 1.

When the multifaced mirror 38 is rotated through a small angle, the image 62 formed by face $M_3$ is apparently stationary. Theoretically, this image is displaced slightly but not sufficiently to produce serious distortion of the photographic image. It is evident that the beam reflected by the face $M_3$ rotates with six times the angular velocity of the rotating mirror 38. This results in a substantial reduction in exposure time and a shorter comparative interval between exposures.

The image formation of the system shown in Fig. 3 is shown in Fig. 4. The image of the object 40 produced by the system is virtual and located at 62.

The method shown in Fig. 3 for producing a rapidly rotating beam is similar to that described above. Fig. 3 shows a multifaced mirror 38 with the auxiliary optical system. Rotation of the mirror 38 produces rotation of any light beams that are incident thereon. Light diverges from a point 40 in the object to be photographed and falls upon the lens 44, converging on the face $M_2$ of the mirror 38. The converging pencil of light undergoes two reflections in its passage from the lens 44 to the point of convergence, one from the face $M_1$ of the mirror 38 and the other from a stationary plane mirror 48. Rotation of the mirror 38 produces rotation of the diverging pencil from 62 in the same direction as the direction of rotation of the mirror 38 but with six times the angular velocity of said mirror 38. It is a well known optical principle that a beam reflected from a mirror undergoes a reflection of $2\theta$ if the mirror is rotated through an angle $\theta$. In the above case since the light is reflected three times by the rotating mirror 38, the beam will rotate at six times the angular velocity of the mirror 38. As the beam rotates, the light in this beam sweeps past the aperture 54, Fig. 3, forming an image of the virtual image 62 on the photographic plate 58. The diverging pencil and the converging pencil have been greatly exaggerated in Fig. 4 for purposes of clarification. The image will be formed on the photographic plate 58, Fig. 3, only during such time as the diverging pencil is sweeping across the aperture 54. Thus the exposure time is approximately proportional to the size of the opening in slit 47, the width of the opening in slit 55, and inversely proportional to the angular velocity of the mirror 38.

Fig. 5 illustrates a preferred method for producing multiple images and shows diagrammatically the image formation of this system. In this figure, the rotating mirror 38 and the virtual image 64 are substantially identical and have been described above. The plane mirrors 52, 53, as previously stated, form multiple images of the object 40, Fig. 3, whose virtual image is indicated at 64. In Fig. 5 only the center beams of the pencils of the other figures are shown to avoid undue complexity of the drawing. The mirrors 52, 53 are plane mirrors of plate glass and are aluminized on the plane surfaces which face each other. The mirror 52 is provided with a full coating which reflects nearly all of the light incident thereon. The mirror 53, however, is only partially coated so that a portion of the light incident thereon is transmitted as beam $bm$ and another portion is reflected as beam $bc$ to region $c$ on the mirror 52. From there it is reflected to region $d$ on the mirror 53 where one part is transmitted as the beam $dn$ and the other part is reflected as beam $de$ to region $e$ on mirror 52. The diverging beams $bm$ and $dn$ form virtual images 64 and 64'. After being reflected at region $e$ of mirror 52, the beam $ef$ falls upon the region $f$ of the mirror 53. Here again, part of the beam $ef$ is transmitted as beam $fo$ and part is reflected as beam $fg$. The beam $fo$ forms a virtual image of the object 40 at 64''. The beam $fg$ is reflected from 52 forming a beam $gh$ which is again split at $h$ on mirror 53 forming beams $hk$ and $hp$. Beam $hp$ forms a third virtual image at 64''' while $hk$ proceeds to form image 64'''' in the manner described above by repeated reflections and transmissions.

Thus, the plane mirrors 52 and 53 serve to form multiple virtual images of the virtual image 64 or ultimately of the object 40. These images are photographed by the lens 56 and the photographic plate 68, Fig. 6. As far as the camera lens 56 is concerned, virtual images 64, 64', 64'', etc. are real objects emitting diverging beams. Furthermore, rotation of the mirror 38 produces rotation of the beams $bm$, $dn$, $fo$, etc. about the points 64, 64', 64'', etc. respectively. This system has the property of causing beams $bm$, $dn$, $fo$, etc. to converge approximately over the same area 74 represented by an opening or aperture in the shutter at location B—B.

Assuming now that the aperture 74 is located at B—B as shown in Fig. 6, all of the beams will pass through the aperture 74 at location B—B simultaneously, continuing to lens 56 which, as shown diagrammatically in Fig. 6, forms simultaneous images of 64', 64'', 64''', and 64'''' on the photographic plate 68. However, if the aperture is displaced to the left of B—B, the beams will not fall on 74 simultaneously but will pass through the aperture in succession as the beams rotate which produces successive images in respect to time on the photographic plate 68. The time between the successive images depends upon the angular velocity of the beams and the position of the aperture 74.

It should be pointed out that the reflecting surfaces of the mirrors 52 and 53 are not parallel but are spaced a greater distance at the ends nearest the octagonal mirror 38 than they are at the other end. As a matter of fact, the reflecting surfaces form an angle of approximately 1°. The angle between the reflecting surfaces determines the linear separation of the images on the photographic plate 68.

In order to equalize the intensity of the images the partial reflection coating on 53 is tapered. It is apparent that without this tapered coating the intensity of the beam $bm$ would be much greater than the intensity of successive beams $dn$, $fo$, etc. Thus the intensity of the successive beams would decrease too rapidly, causing too great a difference of intensity of the photographs. This coating is so tapered that beams of equal intensities are produced. If these images are desired on the photographic plate 68 then this coating must be so tapered and of such thickness as to divide the initial beam from the virtual image 64 into three equal parts or the initial beams may be divided in four, five or more beams as desired. However, as the beams are split or divided into more and more parts, they become less and less intense. Thus there is a practical limit to the number of useable images.

The "time smear" is a characteristic of an optical system containing a rotating mirror which causes images of different parts of the object being photographed to appear in successive periods of time, that is, the field of view of the system sweeps across the object in such manner as to form an image of one side of the object at one instant of time and images of the remaining parts of the object at later successive instants of time.

Figure 7:
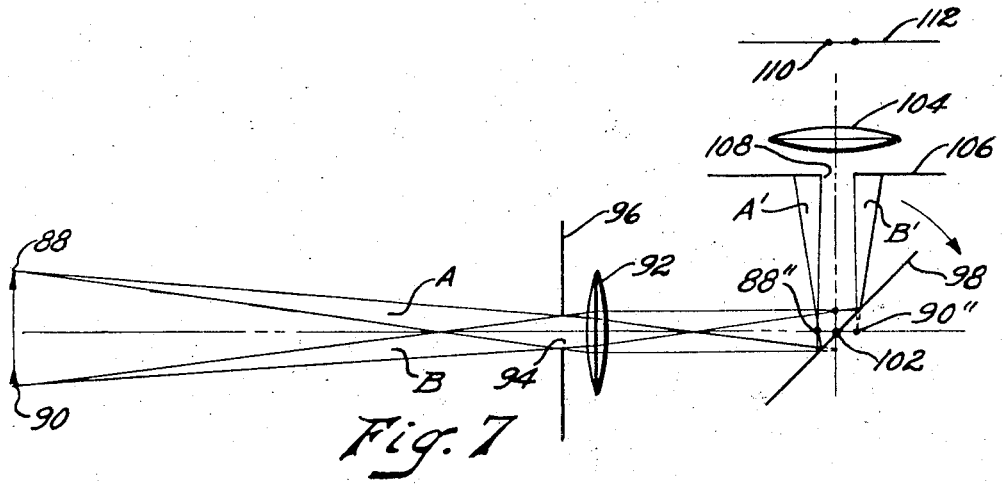
Figs. 7 and 8 illustrate the formation of a "time smear"
Figure 8:
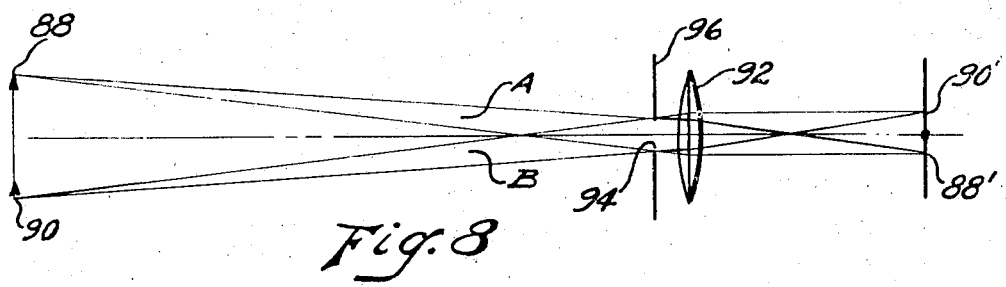

The matter of "time smear" and its reduction or elimination is shown clearly in Figs. 7 and 8. The object is represented as having end portions 88, 90. Beams A and B diverge from the points 88, 90 respectively and strike the lens 92 after passing through the aperture 94 in slit 96. The lens 92 forms images of 88 and 90 at 88' and 90' (Fig. 8). Referring now to Fig. 7 wherein a plane rotating mirror 98 is inserted into the path of the converging beams which form the real images 88' and 90' so that it rotates about a point 102. The plane mirror 98 now forms a real image of 88' at 88" and a virtual image of 90' at 90". These images 88" and 90" serve as objects for the camera lens 104. Beams A' and B' diverge from 88" and 90" respectively and will rotate about these points as the mirror 98 rotates.

Slit 106 having an aperture 108 is located in front of the camera lens 104. The mirror 98 rotates in a clockwise direction and in the position shown in Fig. 7 the beam B' has already swung past the aperture 108 and the image of the point 90 has been formed at 110 on the photographic plate 112. As the mirror 98 continues to rotate, images of points in the object between 88 and 90 will be formed on the photographic plate. It is apparent therefrom that images of points on the object are not formed simultaneously but are formed in successive periods of time.

In photographing rapidly occurring phenomena, such as explosions, or other phenomena where the time is measured in microseconds, "time smear" is not permissible since it prevents significant interpretation of the photographs.

Figure 9:
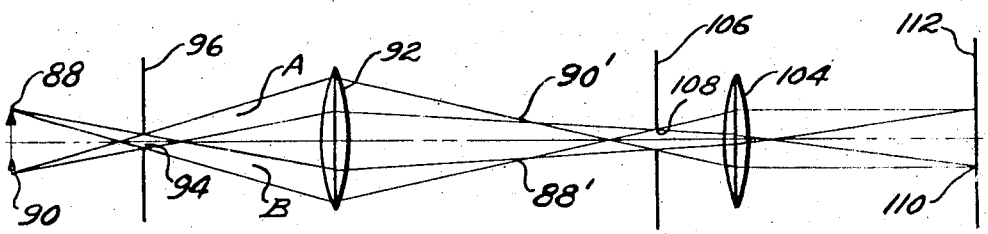
Fig. 9 illustrates an optical system arranged to eliminate "time smear"

"Time smear" however can be substantially eliminated by properly positioning apertures in the optical system. Referring now to Fig. 9, which discloses an optical system similar to the one shown in Figs. 7 and 8, the diverging beams A and B leave the points 88 and 90 on opposite ends of the object and pass through the aperture 94 in slit 96. The point of intersection of the two beams A and B is at the aperture 94. The beams B and A thus pass through the aperture 94 and through the lens 92 to form images at the points 88' and 90'. From these points, the beams diverge as beams A' and B', respectively, crossing the optic axis of the system over a common area at which the opening 108 in slit 106 is located. By so locating the apertures, it is evident that beams from all points on the photographed object pass through the lens 104 simultaneously, thus forming simultaneous images of the points 88, 90 and all points therebetween.

The modification illustrated in Fig. 10 is designed to overcome the formation of undesired images due to reflections from the uncoated surface of mirror 53, Fig. 5. Fig. 10 shows a plate 120 of transparent material such as glass or plastic ground and polished to the shape of the space between the mirrors 52 and 53, Fig. 5. The transparent material is provided with an uncoated portion 122 and a portion 124 which is provided with a full coating of aluminum. The other surface has a partial coating 126 which is tapered to equalize the intensity of the transmitted beams as herein before described. As illustrated the surfaces of 120 are so ground that the surfaces represented by the coatings 124 and 126 are at about 1° to each other.

The present invention has been described with particular reference to specific embodiments thereof but it is to be understood that the invention may be modified if so desired without departing from the spirit of the present invention as defined in the claims.

Having thus described our invention, what we claim as new and desire to secure by Letters Patent of the United States is:

1. In a multiple image system for producing a series of spaced images of a rapidly occurring phenomenon, a rotating reflector on which a beam of light from said phenomenon is incident, an image multiplier positioned to receive said beam from said rotating reflector, said image multiplier comprising mutually opposed reflecting surfaces spaced to cause a plurality of reflections of the beam, the number of reflections being determined by the angle at which said beam is presented to said multiplier, and a photographic system arranged to receive the beams reflected from said multiplier for recording a series of spaced images of said rapidly occurring phenomenon.

2. In a system as defined in claim 1, apertured means in said photographic system for separating the images to be photographed.

3. A system as defined in claim 1 wherein said surfaces of said image multiplier are substantially parallel.

4. A system as defined in claim 1 including a field lens and a slit plate having an aperture therein between said phenomenon to be photographed and said rotating reflector.

5. A system as defined in claim 1 wherein said rotating reflector is comprised of a prism having mirror surfaces.

6. A system as defined in claim 1 wherein said rotating reflector has a plurality of reflecting surfaces thereon.

7. A system as defined in claim 6 including a pair of oppositely inclined reflectors located to receive the beam from said rotating reflector and reflect it to successive surfaces thereof.

8. In a multiple image system for producing a series of spaced images of a rapidly occurring phenomenon, a rotating reflector on which a beam of light from said phenomenon is incident, an image multiplier positioned to receive said beam from said rotating reflector, said image multiplier comprising mutually opposed reflecting surfaces spaced to cause a plurality of reflections of the beam, and a photographic system arranged to receive the beams reflected from said multiplier for recording a series of spaced images of said rapidly occurring phenomenon.

References Cited in the file of this patent

UNITED STATES PATENTS

| | | |
|---|---|---|
| 1,541,218 | Higginson | June 9, 1925 |
| 1,790,491 | Smith | Jan. 27, 1931 |
| 2,400,885 | Miller | May 28, 1946 |
| 2,400,887 | Miller | May 28, 1946 |
| 2,816,476 | Rogers et al. | Dec. 17, 1957 |
| 2,853,918 | Yoler | Sept. 30, 1958 |

FOREIGN PATENTS

| | | |
|---|---|---|
| 487,318 | Great Britain | June 13, 1938 |